(12) United States Patent
Okamoto et al.

(10) Patent No.: US 9,059,482 B2
(45) Date of Patent: Jun. 16, 2015

(54) LEAD ACID BATTERY MANUFACTURING METHOD AND LEAD ACID BATTERY

(75) Inventors: Takeshi Okamoto, Shizuoka (JP); Seiji Anzai, Aichi (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 631 days.

(21) Appl. No.: 12/865,799

(22) PCT Filed: Aug. 31, 2009

(86) PCT No.: PCT/JP2009/004263
§ 371 (c)(1),
(2), (4) Date: Aug. 2, 2010

(87) PCT Pub. No.: WO2010/035407
PCT Pub. Date: Apr. 1, 2010

(65) Prior Publication Data
US 2010/0323228 A1   Dec. 23, 2010

(30) Foreign Application Priority Data
Sep. 26, 2008   (JP) .................................. 2008-247850

(51) Int. Cl.
*H01M 2/04* (2006.01)
*H01M 10/06* (2006.01)
(Continued)

(52) U.S. Cl.
CPC ............ *H01M 10/06* (2013.01); *Y10T 29/4911* (2015.01); *H01M 2/043* (2013.01); *H01M 2/1235* (2013.01); *H01M 2/1252* (2013.01); *H01M 2/362* (2013.01); *H01M 10/121* (2013.01); *Y02E 60/126* (2013.01); *Y02T 10/7016* (2013.01)

(58) Field of Classification Search
CPC ... H01M 2/043; H01M 2/1235; H01M 10/06; H01M 10/1252; H01M 10/121
USPC ....................................................... 429/84–90
See application file for complete search history.

(56) References Cited

U.S. PATENT DOCUMENTS

2005/0147874 A1* 7/2005 Andersen et al. ............... 429/87

FOREIGN PATENT DOCUMENTS

| CN | 101151744 A | 3/2008 |
| JP | 10-228892 | 8/1998 |

(Continued)

OTHER PUBLICATIONS

Notice of Reasons for Rejection, with English translation, issued in Japanese Patent Application No. 2009-551906, dated Feb. 9, 2010.

*Primary Examiner* — Milton I Cano
*Assistant Examiner* — Stephen Yanchuk
(74) *Attorney, Agent, or Firm* — McDermott Will & Emery LLP

(57) ABSTRACT

A lead-acid battery having a reliable exhaust structure suppressing unexpected leakage of acid mist and gas to outside the battery. The battery having a first gas exhaust path A for guiding gas generated in a plate pack from a cell compartment to a recess formed in a cover. A top lid is placed on the top surface of the cover to extend over the recess. The top lid and the cover form a closed shape so that the recess and the top lid form an exhaust chamber. A through hole for establishing communication between a first opening formed in the recess and a second opening formed in the outer surface of the cover, serves as a second gas exhaust path B which establishes communication with the first gas exhaust path A through the exhaust chamber.

9 Claims, 13 Drawing Sheets

(51) Int. Cl.
*H01M 2/12* (2006.01)
*H01M 2/36* (2006.01)
*H01M 10/12* (2006.01)

(56) References Cited

FOREIGN PATENT DOCUMENTS

| | | |
|---|---|---|
| JP | 2001-084981 | 3/2001 |
| JP | 2003-045380 | 2/2003 |
| JP | 2003-045394 | 2/2003 |
| JP | 2003-100273 | 4/2003 |
| JP | 2003-100275 | 4/2003 |
| JP | 2005-166320 | 6/2005 |
| JP | 2007-258044 | 10/2007 |
| JP | 2008-117584 | 5/2008 |
| JP | 2008-146895 | 6/2008 |

* cited by examiner

LEAD ACID BATTERY MANUFACTURING METHOD AND LEAD ACID BATTERY

RELATED APPLICATIONS

This application is the U.S. National Phase under 35 U.S.C. §371 of International Application No. PCT/JP2009/004263, filed on Aug. 31, 2009, which in turn claims the benefit of Japanese Application No. 2008-247850, filed on Sep. 26, 2008, the disclosures of which Applications are incorporated by reference herein.

TECHNICAL FIELD

The present invention relates to lead-acid batteries and methods for fabricating lead-acid batteries.

BACKGROUND ART

While starter lead-acid batteries for automobiles are discharged or stored, oxygen gas and hydrogen gas are generated at positive and negative electrodes, respectively, in the principles of their operation. Among these batteries, valve regulated lead-acid batteries cause oxygen gas generated at the positive electrode to be absorbed in the negative electrode in order to suppress hydrogen gas generation at the negative electrode. However, even in such a valve regulated lead-acid battery, when a battery charger at the vehicle side is broken or used in a high-temperature atmosphere, an overcharge occurs, resulting in that oxygen gas and hydrogen gas are emitted through a control valve to outside the lead-acid battery. During the emission of the oxygen gas and hydrogen gas, a trace amount of a dilute sulfuric acid electrolyte in the battery is also emitted in the form of mist (acid mist) to outside the battery in some cases.

In a case where a lead-acid battery for vehicles as described above is installed in an engine compartment, oxygen gas and hydrogen gas emitted from the lead-acid battery into the engine compartment is relatively rapidly diffused into the air, and thus there is little risk of burning the hydrogen gas. The concentration of the acid mist is zero or at a level which is low enough to incur little risk of human and material damage, such as health damage on vehicle passengers and pedestrians when they inhale the acid mist and corrosion of the inside of the engine compartment.

On the other hand, so-called hybrid vehicles using engines and motors as their power sources have become widely available in recent years. In the hybrid vehicles, although Ni-MH batteries and Li secondary batteries are employed as the power sources of the motors, lead-acid batteries are still employed as batteries for auxiliaries of the vehicles.

Unlike ordinary vehicles, in a hybrid vehicle, a lead-acid battery for auxiliaries is placed in the cabin, such as under the sheet, or in the trunk. Such a difference in a place where the lead-acid battery is placed causes the necessities of capturing oxygen gas and hydrogen gas emitted from the lead-acid battery and a trace amount of acid mist, which presented no problems in the past, and of releasing these captured substances to outside the cabin.

For example, Patent Document 1 shows a structure which collectively emits gas generated in cell compartments, specifically a structure in which an exhaust vent is provided in the side surface of a lid of a battery to be connected to an end of an exhaust pipe and the other end of the exhaust pipe is guided from the cabin or the trunk to outside the cabin.

In the battery shown in Patent Document 1, a recess provided in a lid (corresponding to a cover) is covered with a cap (corresponding to a top lid) in order to collectively emit gas generated in the cell compartments, and thus it is necessary to assure hermeticity at a joint between the lid and the cap. When hermeticity is not assured at the joint, gas and acid mist leak from a gap between the cap and the recess, and thus these gas and acid mist accumulate in the cabin or trunk. This phenomenon is obviously undesirable in terms of safety or hygiene.

Lead-acid batteries for auxiliaries of hybrid vehicles are required to be small. For this purpose, as shown in Patent Document 1, ultrasonic welding is employed in joining the cover and the top lid to each other. This is because the top lid is made of a thin plate having a thickness of about 1 mm to about 2 mm in a small lead-acid battery, and thus heat welding using an ordinary heating plate might cause deformation of the entire top lid.

CITATION LIST

Patent Document

PATENT DOCUMENT 1: Japanese Patent Publication No. 2003-45380
PATENT DOCUMENT 2: Japanese Patent Publication No. H10-228892
PATENT DOCUMENT 3: Japanese Patent Publication No. 2007-258044
PATENT DOCUMENT 4: Japanese Patent Publication No. 2008-146895

SUMMARY OF THE INVENTION

Technical Problem

However, it was found that it is difficult for the ultrasonic welding to assure hermeticity for a long period of time.

In addition, in a battery having a structure including a collective exhaust vent connected to a pipe in order to release gas and acid mist to outside the battery, the appropriate position of the collective exhaust vent differs among specifications of vehicles. For this reason, there has been another problem of an increase in the number of types of batteries. In solving the problem, a technique with which a plurality of collective exhaust vents are originally provided and unused ones of the collective exhaust vents are plugged is conceivable. However, this technique requires fabrication and attachment of additional parts of plugs, and thus is not useful in view of productivity enhancement. In addition, the technique can cause an operational error in which a collective exhaust vent to be plugged is mixed up with an inappropriate collective exhaust vent, and as a result, the inappropriate collective exhaust vent is incorrectly plugged.

Furthermore, after the battery has been installed in the vehicle, the user or inspector can incorrectly remove a plug from a collective exhaust vent, or vibration of the vehicle can cause the plug to fall from the collective exhaust vent or, even if not, the hermeticity between the plug and the collective exhaust vent can degrade, thereby allowing acid mist and oxygen and hydrogen gases to leak into the cabin or the trunk.

It is therefore an object of the present invention to provide a lead-acid battery with a reliable exhaust structure for preventing unexpected leakage of acid mist and gas into outside the battery, and a method for fabricating such a battery.

Solution to the Problem

To solve the above-mentioned problems, a method for fabricating a lead-acid battery according to the present invention is a method for fabricating a lead-acid battery including a container which includes a cell compartment for housing a plate pack and an electrolyte and has an opening at a top thereof, a cover extending over the opening of the container, and a top lid covering a recess formed in a top surface of the cover, and each of the top lid and the top surface of the cover is made of a thermoplastic resin. The method includes the steps of: placing the cover on the container in such a manner that the cover extends over the opening of the container, and fixing the container and the cover to each other; (X) forming, in the cover, a first gas exhaust path for guiding gas generated in the plate pack, from the cell compartment to the recess, and for preventing an overflow of the electrolyte; and (Y) placing the top lid on the top surface of the cover in such a manner that the top lid covers the recess, and applying laser light onto the top lid, thereby welding the top lid and the cover to each other, wherein in step (Y), a joint is formed by the welding to continuously extend in the form of a band and form a closed shape so that the joint, the recess, and the top lid form an exhaust chamber, and a through hole formed in the cover to establish communication between a first opening formed in the recess and a second opening formed in an outer surface of the cover, serves as a second gas exhaust path which communicates with the first gas exhaust path through the exhaust chamber.

In the method, multiple ones of the first opening may be provided, multiple ones of the second opening may be provided, multiple ones of the second gas exhaust path for establishing communication between the first opening and the second opening may be provided and do not communicate with one another, the exhaust chamber may be formed by the top lid and part of the recess, and in step (Y), a path for application of the laser light may be designed such that at least one of the multiple ones of the first opening is open to an inside of the exhaust chamber, and at least another of the multiple ones of the first opening is open to a portion outside the exhaust chamber.

In step (X), a liquid inlet plug including the first gas exhaust path may be attached to a liquid inlet provided in the top surface of the cover.

The first gas exhaust path may be provided with a control valve which opens to open the first gas exhaust path when an internal pressure of the cell compartment is at a given value or more, and which closes to close the first gas exhaust path when the internal pressure of the cell compartment is less than the given value.

A lead-acid battery according to the present invention includes: a container which includes a cell compartment for housing a plate pack and an electrolyte and has an opening at a top thereof; a cover extending over the opening of the container; and a top lid covering a recess formed in a top surface of the cover, wherein the top lid is joined to the top surface of the cover in such a manner that a joint between the top lid and the top surface of the cover continuously extends in the form of a band and forms a closed shape so that the top lid and part of the recess in the cover form an exhaust chamber, and the cover includes a first gas exhaust path for guiding gas generated in the plate pack, from the cell compartment to the exhaust chamber, and also includes a plurality of through holes serving as second exhaust paths which establish communication between the recess and a portion outside the battery, at least one of the second exhaust paths is connected to the exhaust chamber, and at least another of the second exhaust paths is connected to the recess located outside the exhaust chamber, the second exhaust paths do not communicate with one another in the cover, openings of the second exhaust paths at a side close to the recess are separated from one another and are open to the recess, and openings of the second exhaust paths at a side close to the portion outside the battery are separated from one another and are open to the portion outside the battery In the foregoing battery, a liquid inlet may be formed in the top surface of the cover, and a liquid inlet plug including the first gas exhaust path may be attached to the liquid inlet.

The first gas exhaust path may be provided with a control valve which opens to open the first gas exhaust path when an internal pressure of the cell compartment is at a given value or more, and which closes to close the first gas exhaust path when the internal pressure of the cell compartment is less than the given value.

In the battery, each of the top lid and the top surface of the cover may be made of a thermoplastic resin, and the joint may be formed by welding with laser light.

In the battery, the top lid may have a projection extending in the form of a band corresponding to the joint and forming a closed shape, on a surface thereof facing the top surface of the cover, and when the top lid is placed on the top surface of the cover at a position rotated by 180° in parallel with the top surface of the cover from a state in which the exhaust chamber is formed, a different exhaust chamber is formed in such a manner that the projection has a structure which causes at least one of the second exhaust paths connected to the exhaust chamber to be connected to a portion outside the different exhaust chamber, and which causes at least another of the second exhaust paths connected to the portion outside the exhaust chamber to be connected to the different exhaust chamber.

Advantages of the Invention

With a fabrication method according to the present invention, a highly reliable collective-exhaust-type lead-acid battery capable of suppressing leakage of acid mist and gas to outside the battery can be fabricated without a loss of productivity.

DESCRIPTION OF EMBODIMENTS

Figure 1:
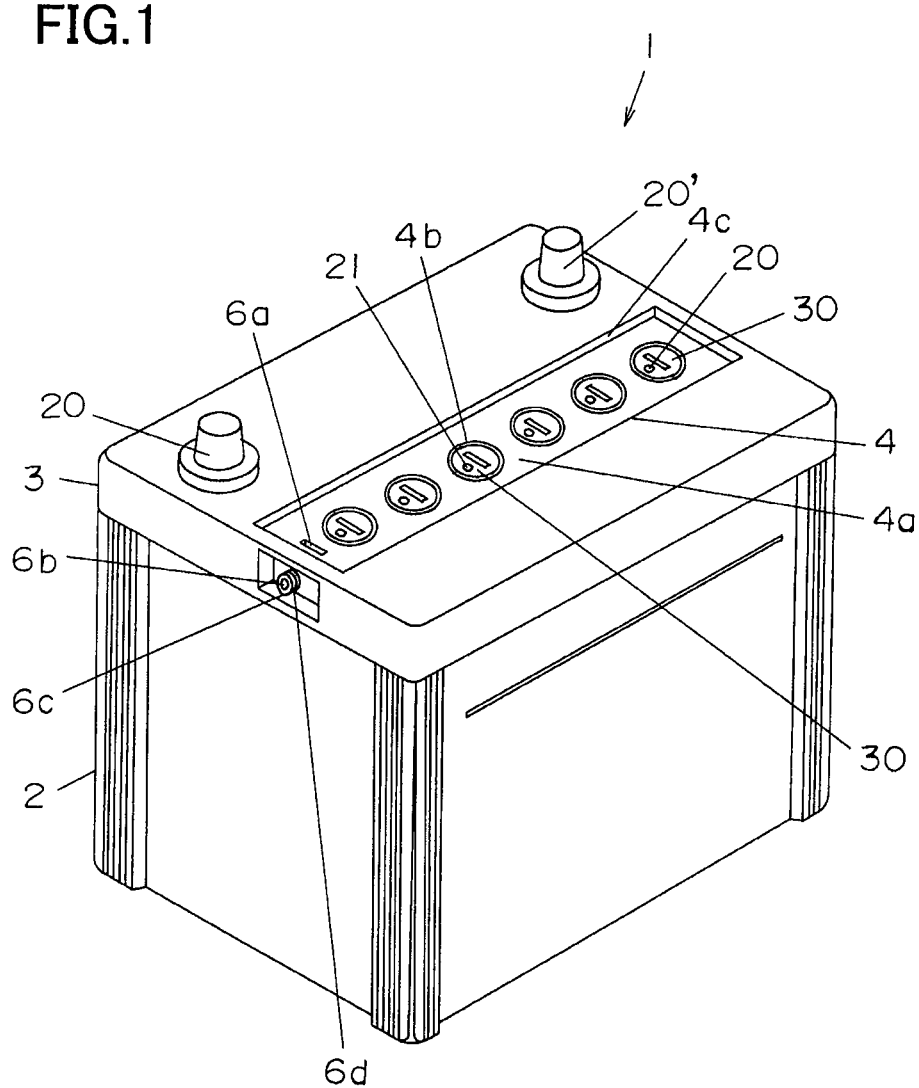
FIG. 1 is an outline view illustrating a state in the middle of assembly of a lead-acid battery according to a first embodiment.

In this specification, the term "join" means to attach two objects to each other to connect (or fix) these objects, and includes the meanings of, for example, "bond" and "weld." A "liquid inlet" is an opening for pouring an electrolyte in a cell compartment. The "outer surface" of a cover is a portion of the surface of the cover exposed to outside a lead-acid battery as a final product.

Prior to the description of embodiments, a study of a new lead-acid battery configured to be placed in a cabin of a vehicle, such as a hybrid vehicle, is described. A lead-acid battery in which a cover and a top lid are heat welded with ultrasonic wave is a battery of a conventional type placed outside the cabin. Such a lead-acid battery does not require hermeticity between the cover and the top lid, and generally employs a structure in which directors (i.e., projections for ultrasonic welding) serving as welding margins are uncontinuously formed on the top lid in order to emit gas generated in the cell compartment to outside the battery through gaps between the directors. Thus, such a lead-acid battery is not originally focused on a collective exhaust structure.

In ultrasonic welding itself, it is difficult to assure a welding area which is large enough to maintain hermeticity for a long period of time between the top lid and the cover by increasing the dimensions of the directors because of the principle of the ultrasonic welding. Specifically, even in a structure in which the joint is made in the form of a band in order to assure hermeticity, when the width of the joint exceeds 1 (one) mm for the purpose of assuring hermeticity, the ultrasonic energy becomes excessive to break the top lid. Thus, it was found that because of the difficulty in assuring hermeticity for a long period of time, it is extremely difficult to apply ultrasonic welding to a lead-acid battery of a collective exhaust type in joining the top lid and the cover together. This is because it is very difficult to maintain hermeticity for a long period of time, e.g., several years, when the width of the joint is less than 1 (one) mm. The foregoing fact was found by the inventors of the present invention.

In addition, a technique of joining the top lid and the cover together with an adhesive is also conceivable. However, in such a technique, various problems can arise when the amount of the adhesive varies in fabricating a small lead-acid battery. For example, when the adhesive amount is smaller than a given amount, the adhesive does not reach a portion requiring a joint between the top lid and the cover, thereby causing air leakage between the top lid and the cover. On the contrary, when the adhesive amount is larger than the given amount for some reasons, the adhesive overflows to ruin the appearance of the battery, to fix a control valve, or to block a gas exhaust hole. In such cases, the cell compartment is completely sealed, thereby increasing the internal pressure of the battery to an abnormal level, and eventually causing breakage of the container or the cover.

However, it is possible to take a large joint margin in a large lead-acid battery such as a large lead-acid battery having battery capacity of 200 Ah to 8000 An, or in even a lead-acid battery have a smaller battery capacity, as long as a large area on the lid is assured. This results in that the range of variation in the adhesive amount acceptable in fabricating such lead-acid batteries is much wider than that of the acceptable adhesive amount for relatively small lead-acid batteries or lead-acid batteries in which a large welding margin cannot be taken in design because of the limitation of area on the lid. In a case where the amount of the adhesive is set large in consideration of the upper limit of the variation range in the adhesive amount in using a widely-used adhesive applicator, no adhesive overflows to reach the outside of the top lid or a gas exhaust hole, for example, in such a large lead-acid battery. In addition, in a case where the adhesive amount is relatively small in consideration of the lower limit of the variation range in the adhesive amount in using a widely-used adhesive applicator, sufficient hermeticity can be obtained.

In view of the foregoing aspects, the inventors of the present invention have conducted various studies, and arrived at the present invention.

Lead-acid batteries and methods for fabricating the lead-acid batteries according to embodiments of the present invention will be described hereinafter with reference to the drawings.

Embodiment 1

A lead-acid battery according to a first embodiment will hereinafter be referred to as a battery 1 shown in FIG. 1. Now, a structure of, and a method for fabricating, the battery 1 will be described.

FIG. 1 is a view illustrating a state in the middle of assembly of the battery 1 of this embodiment.

The battery 1 of this embodiment has a structure in which plate packs including positive plates, negative plates, and separators (none shown) are housed in cell compartments provided in a container 2 covered with a cover 3. The container 2 is a rectangular parallelepiped box which is open at the top. In fabricating the battery 1, the step of placing the plate packs in the cell compartments of the container 2 through this opening (i.e., a plate-pack placing step) is performed first. Then, after the cell connection step of connecting the plate packs housed in adjacent cell compartments to each other, the step of covering the opening with the cover 3 and fixing the container 2 and the cover 3 to each other (i.e., the cover fix step) is performed. Then, the terminal welding step of welding poles from the plate packs and battery terminals together is performed. Subsequently, a dilute sulfuric acid electrolyte is poured through liquid inlets provided in the cover 3. Thereafter, current is caused to flow between the terminals, thereby charging the lead-acid battery. The height of the electrolyte surface and the sulfuric acid concentration in the electrolyte after charging the battery are adjusted as necessary. Then, the liquid inlet plug attachment step (i.e., the step X) of attaching liquid inlet plugs which will be described later to the liquid inlets in the cover 3 is performed. In this manner, the state illustrated in FIG. 1 is obtained.

As already well known in the art, in a case where the battery 1 is a 12V battery, the battery 1 in this case has a similar structure as that of a known starter lead-acid battery in the following points. First, the container 2 is divided into six cell compartments with partitions. Second, poles (not shown) from the plate packs housed in the cell compartments at both ends are inserted into terminal bushings which are insert-molded in the cover 3, and the terminal bushings and the edges of the poles are welded together, thereby forming battery terminals 20, 20' on the cover 3. These two points do not constitute features of the present invention. Accordingly, for example, battery manufacturers may arbitrarily select design specifications such as the number of cell compartments, a method for forming the terminals 20, 20', a technique of sealing the terminals 20, 20' and the cover 3, and the timing of pouring the electrolyte into the container (i.e., whether attachment of the cover is performed before or after the pouring of the electrolyte).

In this embodiment, a recess 4 is formed in the top surface of the cover 3. The bottom 4a of the recess 4 has first vents 21 for releasing oxygen gas and hydrogen gas generated in the positive plate and the negative plate in the cell compartments. The first vents 21 are intended to release the above-mentioned gases, and thus the diameter thereof only needs to be about 1.5 φ. Accordingly, in pouring the electrolyte into the cell compartments, it is sufficient to insert injection nozzles into the first vents 21 so as to inject a given amount of a dilute sulfuric acid electrolyte.

Increasing the diameter of the first vents 21 used as the liquid inlets is preferable in shortening the injection time. However, in the case where the battery 1 is a liquid electrolyte battery, a larger diameter of the first vents 21 tends to cause an overflow of the electrolyte in the cell compartments. Therefore, more preferably, a plurality of liquid inlets 4b having a larger diameter than that of the first vents 21 are formed in the bottom 4a to be associated with the respective cell compartments, and liquid inlet plugs 30 provided with the first vents 21 are attached to the liquid inlets 4b. The liquid inlet plugs 30 only need to have the function of releasing gas generated in the cell compartments, and may be known liquid inlet plugs such as liquid inlet plugs for a lead-acid battery disclosed in Patent Document 2.

Figure 2:
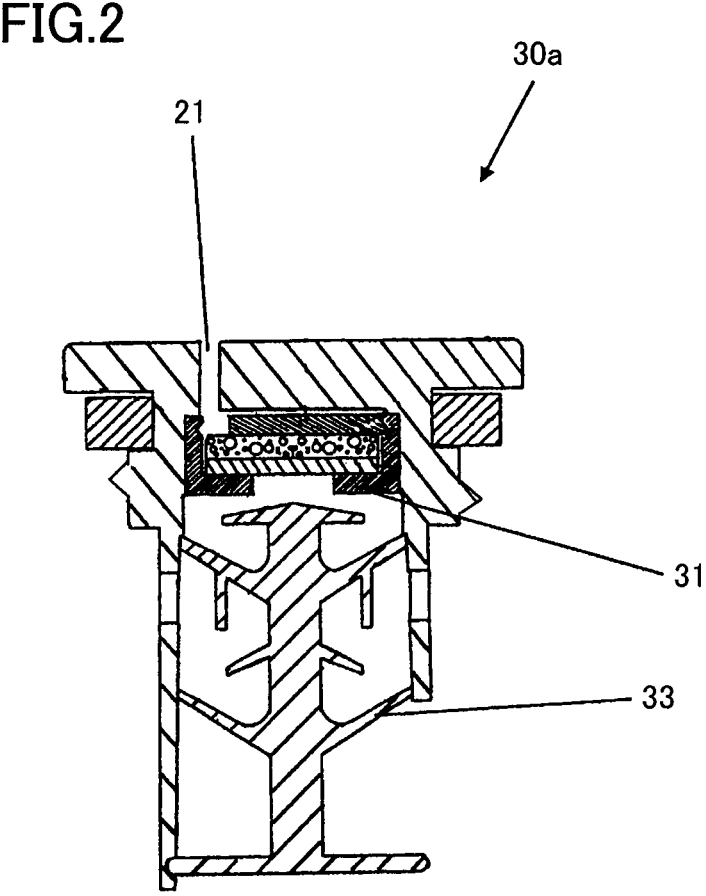
FIG. 2 is a cross-sectional view schematically illustrating a liquid inlet plug.

The first vents 21 do not need to always communicate with the cell compartments, and may be configured to open when it becomes necessary to emit accumulated oxygen and hydrogen gases generated in the cell compartments to outside the cell compartments because of an increase in the internal pressure of the cell compartments caused by the oxygen and hydrogen gases. Accordingly, the liquid inlet plugs 30 may be replaced with, for example, liquid inlet plugs 30a disclosed in Patent Document 3 and including control valves 31 which open and close according to the internal pressure of the cell compartments shown in FIG. 2. Patent Document 3 was made by the same inventors as those of the present invention, filed with Japan Patent Office prior to the present invention, and then published. Alternatively, the liquid inlet plugs 30 may be replaced with liquid inlet plugs 30b disclosed in Patent Document 4 and provided with a cover 32 extending over part of the gas exhaust passageway shown in FIG. 3. Patent Document 4 was made by the same inventors as those of the present invention, filed with Japan Patent Office prior to the present invention, and then published.

The liquid inlet plugs 30, 30a, or 30b may be provided with known splash-protection members 33 in order to prevent electrolyte splash from easily leaking into the inside of the liquid inlet plugs 30, 30a, or 30b. In each of the liquid inlet plugs 30, 30a, and 30b, a porous filter (not shown) obtained by sintering a granular material of, for example, alumina, PP homopolymer, PE homopolymer, or PP-PE copolymer. It is, of course, sufficient to use such a filter, as necessary, to achieve suppression of liquid reduction, suppression of an overflow, and a function as a spark arrester. These liquid inlet plugs 30, 30a, or 30b constitute first gas exhaust paths. In the first gas exhaust paths, the diameter of the first vents 21 is much smaller than that of the liquid inlets 4b, thus preventing an overflow of the electrolyte.

In the case of using the liquid inlet plugs 30a including valves as mentioned above, the plug shown in Patent Document 3 is based on the assumption that the plugs 30a are used in a liquid electrolyte lead-acid battery. Alternatively, the battery 1 may be a valve regulated lead acid battery in which a mat separator is impregnated with an electrolyte.

In a case where the battery 1 of this embodiment is of a valve regulated type, elastic plate-like valves (not shown) of, for example, rubber may be brought into contact with the first vents 21 so that the first vents 21 and the plate-like valves form control valve structures which open and close according to the internal pressure of the cell compartments. Alternatively, the first vents may be cylindrical and equipped with valve caps to form control valve structures which open and close according to the internal pressure of the cell compartments.

Figure 4:
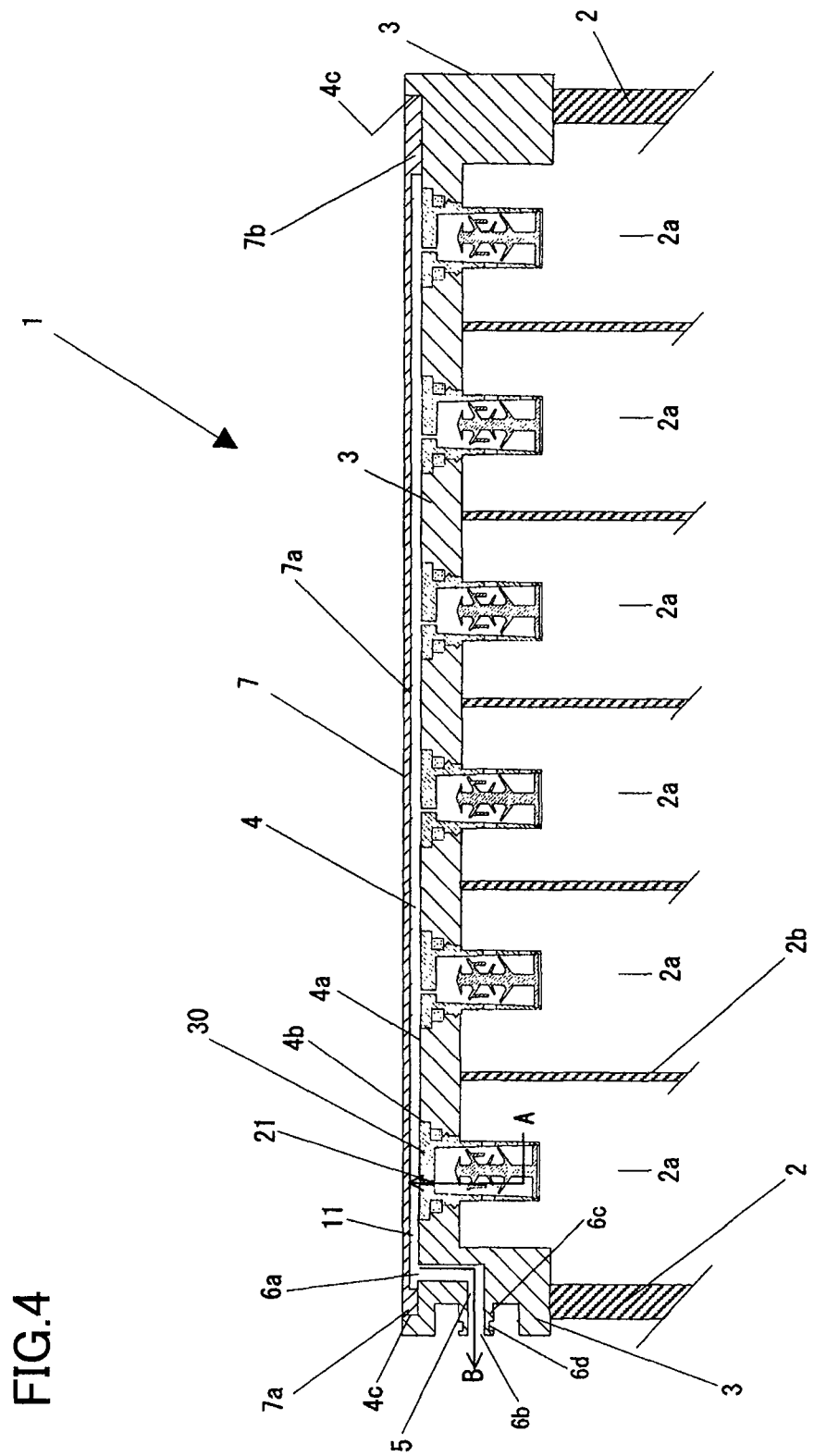
FIG. 4 is a cross-sectional view schematically illustrating a state in which a top lid is placed over a recess.

In the battery 1, a top lid 7 is joined to the top surface of the cover 3 with a technique which will be described below. FIG. 4 is a cross-sectional view illustrating a state in which the top lid 7 is placed on the top surface of cover 3 to extend over the recess 4. In this state, the top lid 7 and the top surface of the cover 3 are not joined together.

Now, a structure of the cover 3 of this embodiment is described. FIG. 4 illustrates an example in which one liquid inlet 4b is formed in the bottom 4a of the recess 4 provided in the cover 3 for each cell compartments 2a and in which the liquid inlet plug 30 including the first vent 21 is attached to this liquid inlet 4b. In the example of FIG. 4, first gas exhaust paths A for releasing gas accumulated in the cell compartments 2 are provided between the first vents 21 and the cell compartments 2a. In FIG. 4, the terminals 20, 20' are omitted for simplicity.

The cover 3 has a through hole 5 for establishing communication between the recess 4 and the outer surface (i.e., the side surface) of the cover 3. The through hole 5 has a first opening 6a which is open to the recess 4 and a second opening 6b which is open at the outer surface of the cover 3.

The through hole 5 serves as a second gas exhaust path B for releasing, to outside the battery 1, gas emitted through the first vents 21 by way of the first gas exhaust paths A. Accordingly, the second opening 6b, of course, needs to be formed at a portion of the outer surface of the cover 3 except for the recess 4. In FIGS. 1 and 4, the second opening 6b is formed in a side portion of the outer surface of the cover 3, as an example.

A configuration in which the second opening 6b has an exhaust pipe attachment structure for attaching an exhaust pipe (not shown) for guiding generated gas to a place where the gas is to be released from the location of the battery 1 such as the inside of the cabin or trunk into the atmosphere as necessary, is obvious, and is not a feature of this embodiment. As illustrated in FIG. 1A, as an example of the exhaust pipe attachment structure, the second opening 6b is preferably provided with a nozzle 6c or an engagement means for ensuring stationary attachment of the nozzle 6c to the exhaust pipe. In the example illustrated in FIGS. 1 and 4, a trench 6d is formed in the inner circumferential wall of the nozzle 6c as an engagement means. In such a case, it is sufficient to provide the exhaust pipe with an annular projection (not shown) which is engaged in the trench 6d. Such a structure for attaching the exhaust pipe to the second opening 6b is an example, and of course, any other known structures may be employed.

Figure 5:
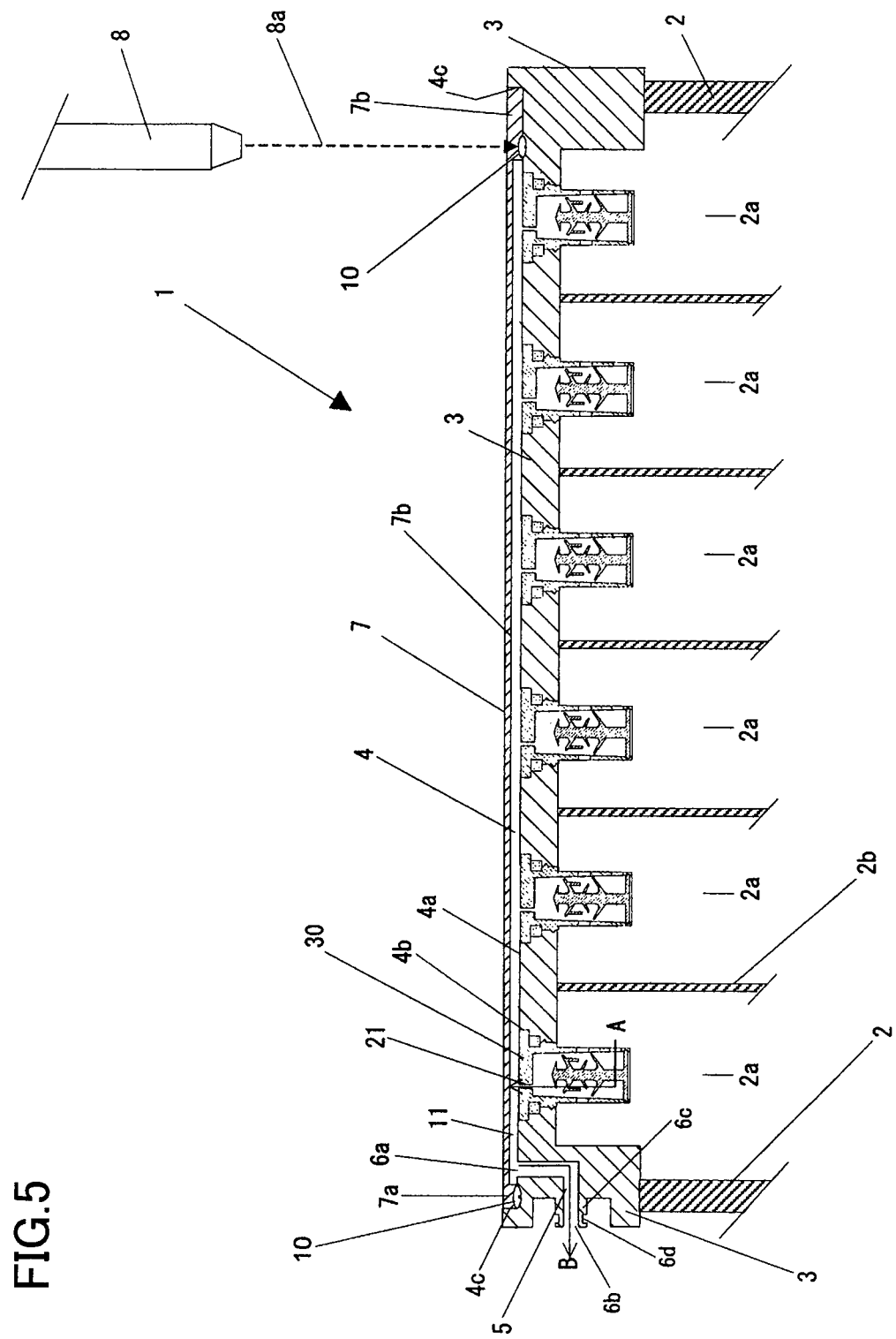
FIG. 5 is a view schematically illustrating a process of joining the top lid to the recess.

Then, a method for joining the top lid 7 and the top surface of the cover 3 together is described with reference to FIG. 5. Each of the top lid 7 and the cover 3 having the recess 4 employed in the battery 1 of this embodiment is made of a thermoplastic resin which can be treated with heat welding, e.g., polypropylene resin. Accordingly, similarly to the cover 3, the bottom 4a of the recess 4, which is part of the top surface of the cover 3, is also made of the thermoplastic resin. In FIG. 5, the terminals 20, 20' are omitted for simplicity.

In addition, in this embodiment, the top lid 7 and the recess 4 are joined together by heat welding with application of laser light 8a. In consideration of this application, a thermoplastic resin which is optically transparent so as to allow the laser light 8a for use in this heat welding to easily pass therethrough is employed as the thermoplastic resin forming the top lid 7. The laser light 8a which has passed through the top lid 7 causes the surface of the recess 4 to melt, and as a result, the top lid 7 and the recess 4 are heat welded together, thereby forming a joint (i.e., a joint portion) 10. Accordingly, the light transmittance of the top lid 7 at the wavelength of the laser light 8a is preferably higher than that of the surface, e.g., the bottom 4a, of the recess 4 serving as a joint surface between the recess 4 and the top lid 7. For example, if the light transmittance of the top lid 7 is 20% of laser light 8a having a wavelength of 940 nm described below, the light transmittance of the bottom 4a with respect to the 940-nm laser light 8a is preferably 0%. Since the bottom 4a is part of the top surface of the cover 3, the light transmittance of the bottom 4a and the cover 3 is lower than that of the top lid 7.

Figure 6:
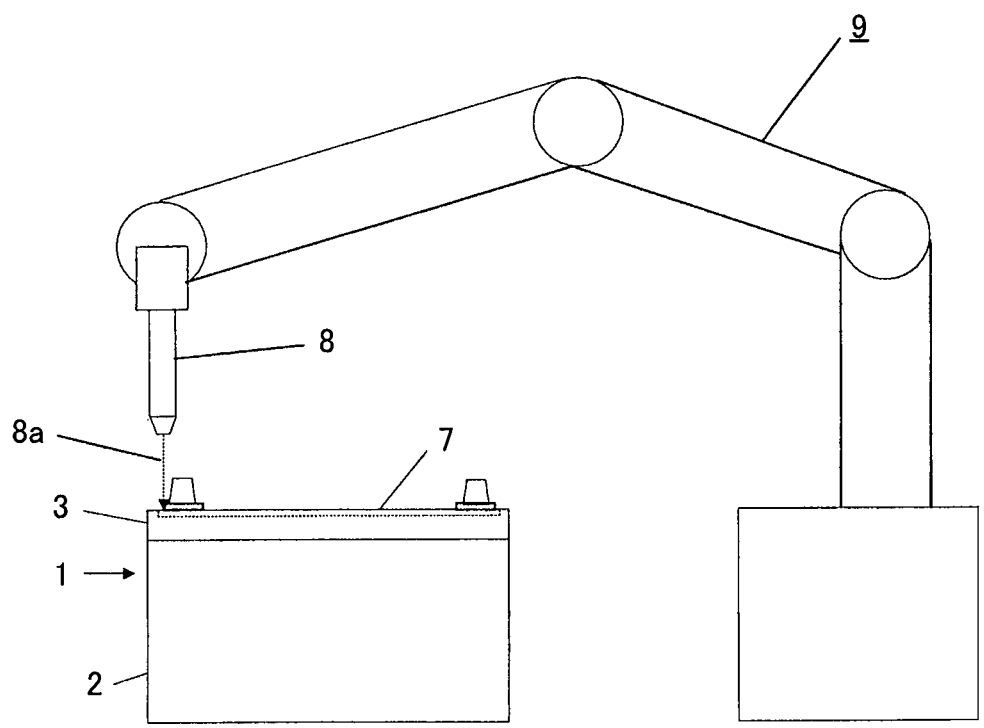
FIG. 6 is a view illustrating examples of a battery, a laser light source, and a sweep device.

As illustrated in FIG. 6, to weld the top lid 7 and the bottom 4a of the recess 4 to each other with laser light 8a, the laser light source 8 is caused to move (sweep) along the periphery of the top lid 7 by using a sweep device 9, while applying laser light 8a having a given wavelength and given power, e.g., the above-mentioned laser light 8a with a wavelength of 940 nm, onto the top lid 7 and the cover 3. In the portion subjected to the sweeping of the laser light source 8, the laser light 8a passes through the top lid 7, but does not pass through the cover 3 or the amount of the laser light 8a which has passed through the cover 3 is smaller than the laser light 8a which has passed through the top lid 7. Thus, the amount of heat generated at the cover 3 is larger than that at the top lid 7, resulting in that the top lid 7 and the cover 3 are heat-welded at the top surface of the cover, e.g., the bottom 4a of the recess 4, to form a joint. To heat-weld the top lid 7 and the recess 4 more firmly, it is sufficient that the cover 3 is made of a black thermoplastic resin which does not pass laser light therethrough and the top lid 7 is made of a thermoplastic resin which passes laser light therethrough.

The transmittance with respect to laser light depends on materials for the top lid 7 and the cover 3 and the thicknesses of the top lid 7 and the cover 3. Accordingly, the laser-light transmittance of a thermoplastic resin forming each of the top lid 7 and the cover 3 can be adjusted by changing the type of filler, such as silica and talc, added to the thermoplastic resin, the content of the filler, the type of a pigment added to the thermoplastic resin, and the content of the pigment.

If the transmittance of the top lid 7 with respect to laser light is too low, or laser light does not pass through the top lid 7 at all, heat is generated at the outer surface of the top lid 7 to cause the outer surface of, and/or the inside of, the top lid 7 to melt. Thus, in this case, the top lid 7 and the recess 4 cannot be heat-welded. Accordingly, the transmittance of the top lid 7 with respect to laser light needs to be set at a level at which such a phenomenon does not occur.

The transmittance of the cover 3 with respect to laser light may be zero, but does not need to be zero. The transmittance of the cover 3 only needs to be at a level at which the amount of heat generated at the top surface of the cover 3 is large enough to cause heat welding of the top lid 7. Accordingly, although it is sufficient to select the material for, and the thickness of, the top lid 7 having a light transmittance sufficient for welding with laser light and the material for the cover 3, it is at least necessary to set the light transmittance, with respect to laser light, of the top lid 7 higher than that of the cover 3.

Figure 7:
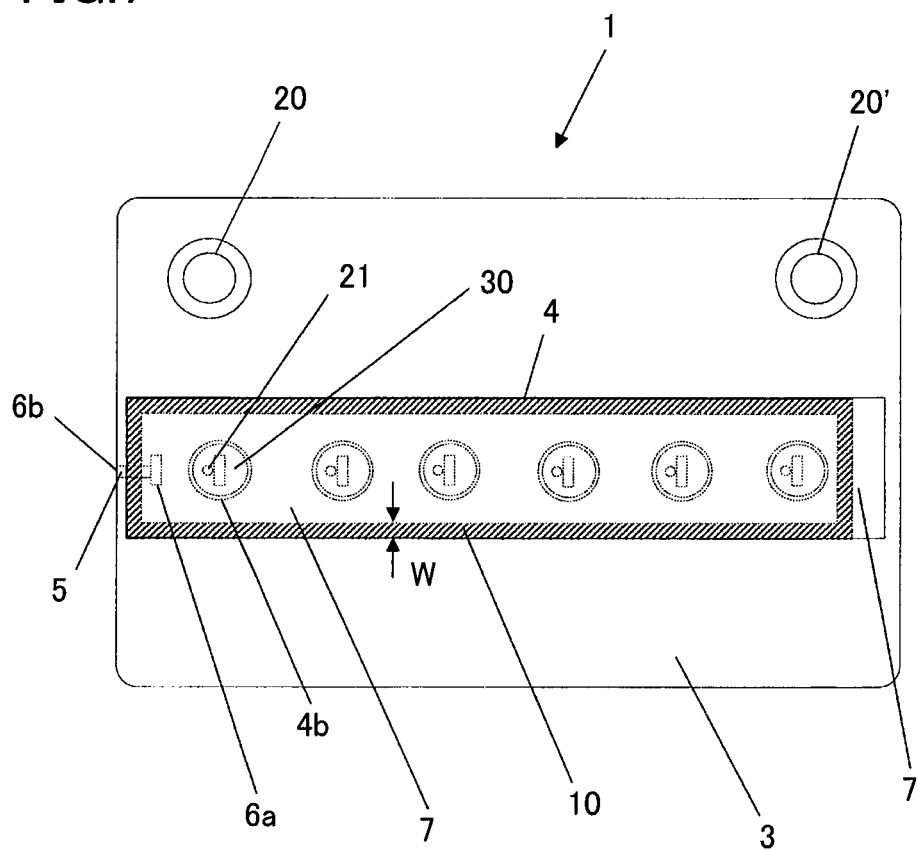
FIG. 7 is a view illustrating a top panel of the lead-acid battery of the first embodiment.

FIG. 7 is a view showing a state in which a joint 10 is formed by performing sweeping with laser light 8a applied onto the periphery of the top lid 7 from above the top lid 7. Since the joint 10 is covered with the top lid 7, the joint 10 is indicated by slashes and broken lines and shown in the form as a band for convenience. In the same manner, since the liquid inlet plugs 30, the first vents 21, the first opening 6a, the second opening 6b, and the through hole 5 are covered with the top lid 7 and/or the cover 3, these components are indicated by broken lines. The joint 10 continuously extends in the form of a band along the entire periphery of the top lid 7, and forms a closed rectangular shape. This is because if the joint 10 did not form a closed shape along the entire periphery to form a discontinuous portion (not shown), gas generated in the cell compartments 2a would leak through this discontinuous portion. To prevent gas leakage through such a discontinuous portion, the joint 10 needs to be formed in a closed shape.

Figure 14:
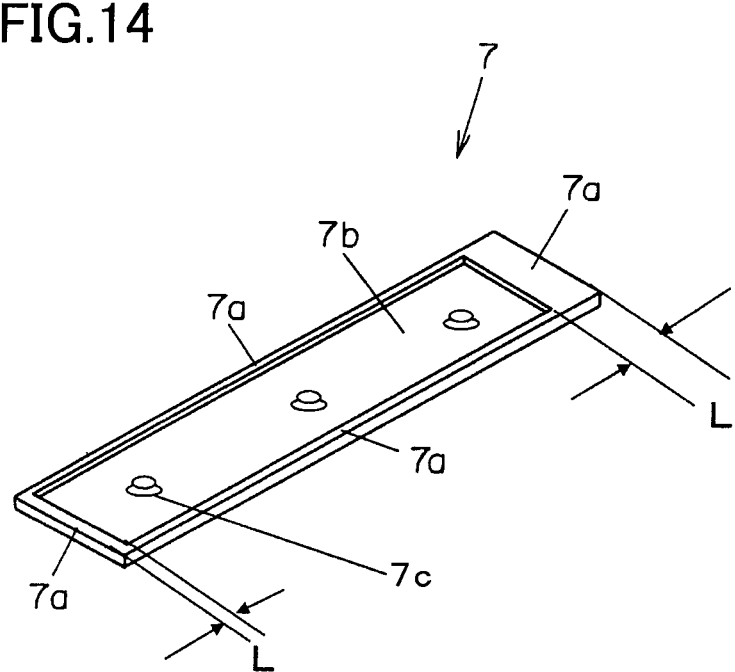
FIG. 14 is a view illustrating a top lid.

For this reason, in this embodiment, the top lid 7 may have a plate shape having a uniform thickness. More preferably, to ensure formation of an exhaust chamber 11 between the top lid 7 and the cover 3, the top lid 7 has a shape in which a thick portion (i.e., a projection) 7a having a shape associated with the joint 10 is provided on a portion of the surface of the top lid 7 facing the top surface of the cover 3 and a relatively thin portion 7b thinner than the thick portion 7a is provided in the other portion of the surface of the top lid 7, as illustrated in FIG. 14. In joining the top lid 7 to the cover 3, it is necessary to bring the thick portion 7a into contact with the top surface of the cover 3. Thus, the thick portion 7a of the top lid 7 and the top surface of the cover 3 are joined with application of an appropriate pressure from the top lid 7 toward the cover 3 so as to bring the thick portion 7a into contact with the top surface of the cover 3.

In addition, as illustrated in FIG. 5, since the joint 10 extends in the form of a band and forms a closed shape as described above, the joint 10, the top lid 7, and the top surface of the cover 3 form an exhaust chamber 11 in which gas emitted through the first vents 21 by way of the first gas exhaust paths A is collected. Accordingly, the first vents 21 are, of course, located within the closed shape of the joint 10.

Furthermore, as illustrated in FIG. 5, to release gas emitted from the cell compartments 2a and collected in the exhaust chamber 11 to outside the battery 1, the first opening 6a of the second gas exhaust path B is formed at the exhaust chamber 11. That is, the first opening 6a is located within the closed shape of the joint 10.

With the above-described structure, gas generated in the cell compartments 2a is released through the second opening 6b to outside the battery 1 by way of the first gas exhaust paths A, the exhaust chamber 11, and the second exhaust path B. The top lid 7 having the thin portion 7b as illustrated in FIG. 14 is preferably used to obtain a sufficient volume of the exhaust chamber 11. In this case, gas is released more smoothly. For example, when the thickness of the thick portion 7a is 1.5 mm, it is sufficient to set the thickness of the thin portion 7b in the range from about 1.0 mm to about 1.3 mm.

The top lid 7 does not necessarily have the thick portion 7a and the thin portion 7b, and may have a uniform thickness. In such a case, a gap sufficient for gas exhaust is provided between the top lid 7 and the bottom 4a, and serves as the exhaust chamber 11. For this reason, the top lid 7 may inherently have a uniform thickness. In this case, acid mist is ejected through the first vents 21 when the battery is overdischarged. Even when dew is formed from the acid mist in the exhaust chamber 11, the dew is pushed out of the exhaust chamber 11 through the first opening 6a with a gas released through the first vents 21 at the same time. This gas is then released through the second opening 6b from the exhaust chamber 11.

However, when the battery is extremely overdischarged because of, for example, a failure of a discharge system at the vehicle side, a large amount of acid mist is ejected through the first vents 21, thereby generating a large amount of water containing sulfuric acid produced by condensation of this acid mist and an electrolyte additive such as sodium sulfate. Even when this water is dried, added substances such as sulfuric acid and sodium sulfate, sodium tetraborate, or aluminium sulfate contained in the electrolyte as an additive might remain without being ejected from the exhaust chamber 11. Such remaining substances hinder the gas exhaust, and increase the internal pressure of the exhaust chamber 11 to cause deformation of the top lid 7. This deformation may cause the joint 42 between the top lid 7 and the top surface of the cover 3 to be less hermetic.

Accordingly, in consideration of the possibilities of abnormal use, i.e., extreme discharge, and misuse, it is preferable to keep the volume of the exhaust chamber 11 as large as possible. Thus, the top lid 7 preferably has the thick portion 7a and the thin portion 7b described above. Further, the inventors carried out another experiment. In this experiment, after continuous discharge for 72 hours, a battery was dried at 75° C. for two weeks, and then the internal pressure of the exhaust chamber 11 upon overdischarge was measured. This experiment shows that in a configuration in which the thickness of the thick portion 7a was 1.5 mm and the thickness of the thin portion 7b was about 1.3 mm, i.e., the inner dimension along the height of the exhaust chamber 11 was about 0.2 mm or more, a rise in the internal pressure of the exhaust chamber 11 was suppressed. The internal pressure of the exhaust chamber obtained when the above example was performed on the top lid having a uniform thickness of 1.5 mm exhibited an increase of 1.5 kPa from the atmospheric pressure. This increase is not significant, and does not reach the level at which the top lid 7 and the top surface of the cover 3 become less hermetic. However, to take all possible means to ensure the safety, the top lid 7 more preferably has the thick portion 7a and the thin portion 7b as described above.

In the case where the top lid 7 has the thin portion 7b, when the top lid 7 is pressed from above, the top lid 7 is deformed downward. To suppress this deformation, a support 7c having the same height as that of the thick portion is preferably provided at a location corresponding to the bottom 4a of the recess 4 in the top lid 7. This support 7c is not necessarily provided on the top lid 7, and may project from the bottom 4a.

In this embodiment, the joint 10 is formed between the top lid 7 and the top surface of the cover 3. Alternatively, since the first opening 6a only needs to reach the inside of the exhaust chamber 11, the joint 10 may be formed at a side wall 4c of the recess 4, for example. The side wall 4c of the recess 4 may be included in the top surface of the cover 3. In this case, laser light 8a needs to be applied upon the top lid 7 not at a right angle but at an oblique angle in such a manner that the side wall 4c is irradiated with the laser light 8a through the top lid 7.

As an example of conditions for laser light application for forming the joint 10, a laser diode with a power of 50 W is used with the wavelength of the laser light set at 940 nm as described above, the top lid 7 is made of a PP resin (e.g., PP-PE copolymer) having a light transmittance of 20% with respect to the light with the above-mentioned wavelength and has a thickness of 1.3 mm, and the joint 10 has a width W (i.e., the width of the band W in FIG. 7) of 2.0 mm. In this example, if the sweep speed of the laser light is set at about 50 mm/sec., the top lid 7 and the cover 3 can be firmly joined together with excellent hermeticity maintained. In this embodiment, the joint 10 is expressed to be in the form of a band. This is because the top lid 7 and the cover 3 are actually joined together at the joint 10, and thus the joint 10 has a width W more than zero. Therefore, the joint 10 may be, of course, expressed to have a liner shape.

The above conditions are only an example. If the wavelength and power are set at different values by using another laser light source, the sweep conditions need to be individually set, of course. The light transmittances of the top lid 7 and the cover 3 with respect to the laser light 8a vary depending on the material for the top lid 7, e.g., whether the PP resin is PP, homopolymer of only PE, or copolymer of PP-PE as used in the example.

The light transmittances also depend on the amount of filler such as silica or talc added to a resin, and the type or amount of pigment, and the thickness of a portion of the top lid 7 forming the joint 10. Thus, in an application of this embodiment, these parameters need to be taken into consideration to firmly join the top lid 7 and the cover 3 to each other while maintaining excellent hermeticity.

Since the top lid 7 has a light transmittance, it can be visually inspected whether the joint 10 has a closed shape within specific dimensions or not. Thus, no hermeticity testings are needed, and it is possible to automatically determine whether or not the joint 10 is formed as designed without the assistance of a person.

The sweep device 9 of the laser light source 8 only needs to be a device which allows the laser light source 8 to be moveable at least above the surface of the top lid 7 in two directions, i.e., along the X axis and the Y axis on a plane parallel to the top lid 7. The laser light source 8 may be, of course, installed in a general-purpose industrial robot such that this industrial robot performs sweeping of the laser light source 8.

In this embodiment, a wide joint can be formed, as compared to ultrasonic welding. Accordingly, excellent hermeticity between the top lid 7 and the cover 3 can be maintained for a long period of time, thereby obtaining a reliable joint. In addition, since no adhesives are used, appearance degradation due to liquid dripping or leakage of an adhesive does not occur, and no furnaces for curing adhesives are necessary. In a case where an adhesive which cures at room temperature is employed, it takes time to complete curing of the resin. However, if this embodiment is applied to an ordinary starter lead-acid battery, a joint is completed in a short period of time from several seconds to over 10 seconds. Thus, as compared to conventional methods as mentioned above, it is possible to fabricate a lead-acid battery with a reliable collective exhaust structure for a short period of time.

Since the top lid 7 is transparent to laser light 8a, the user of the battery 1 can see the structure of the recess 4 through the top lid 7. However, if this transparent structure degrades the appearance of the battery 1, the top lid 7 may be covered with a product label or an opaque label after the top lid 7 and the cover 3 have been joined together.

Embodiment 2

Figure 8:
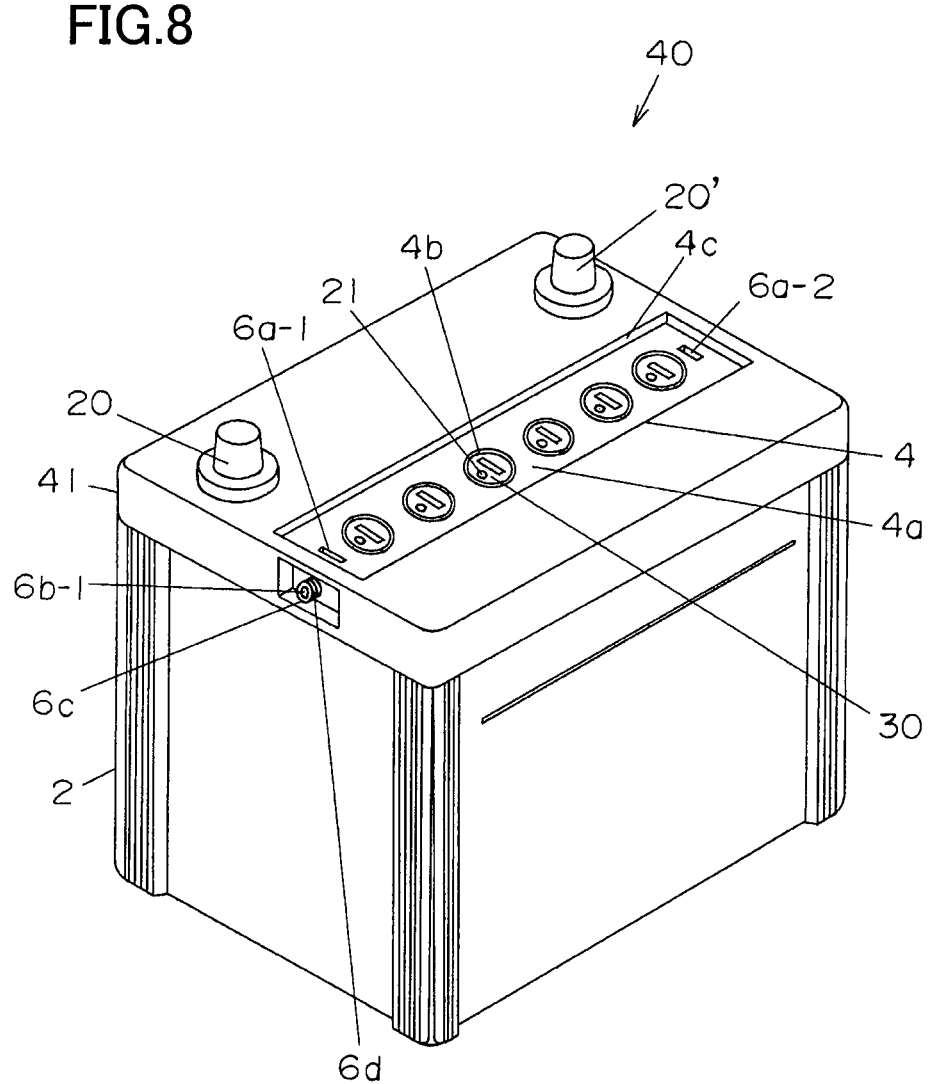
FIG. 8 is an outline view illustrating a state in the middle of assembly of a lead-acid battery according to a second embodiment.

A structure of a lead-acid battery (hereinafter referred to as a battery 40) according to a second embodiment is described. FIG. 8 is a view showing a structure in the middle of assembly of the battery 40. The battery 40 of this embodiment is different from the battery 1 of the first embodiment in the cover and the top lid. In the other aspects, the battery 40 is the same as the battery 1. Thus, only aspects different from the first embodiment are now described.

In this embodiment, a cover 41 has a recess 4 similar to that in the first embodiment. The bottom 4a of the recess 4 has first vents 21.

Figure 3:
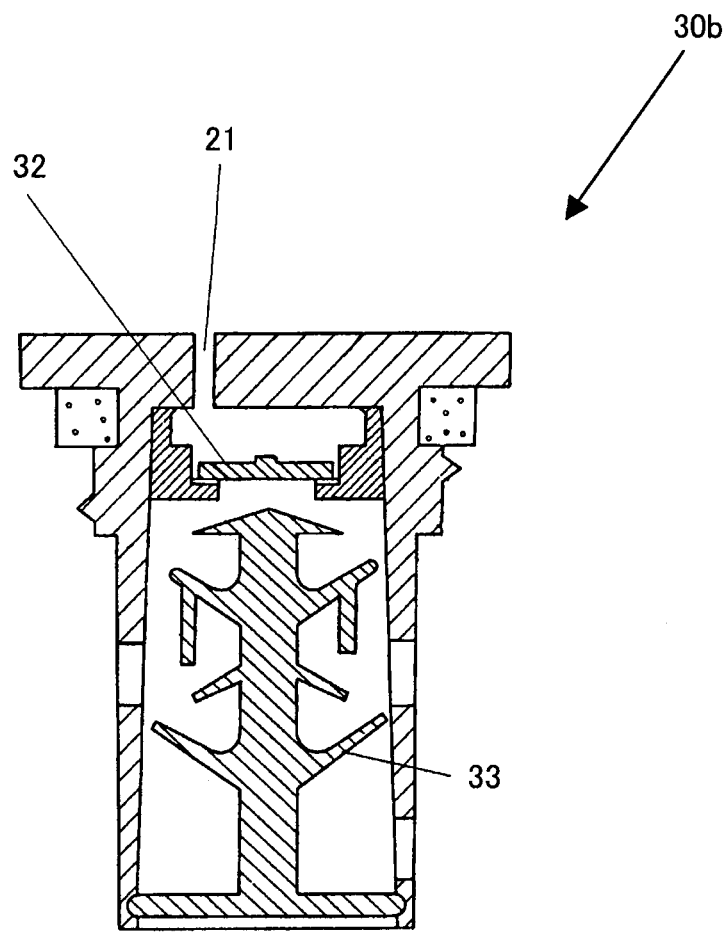
FIG. 3 is a cross-sectional view schematically illustrating another liquid inlet plug.

As in the first embodiment, the first vents 21 do not always need to communicate with the insides of cell compartments 2a, and may open when it becomes necessary to release oxygen and hydrogen gases accumulated in the cell compartments 2a to outside the cell compartments 2a because the accumulated oxygen and hydrogen gases increase the internal pressure of the cell compartments 2a. Accordingly, the liquid inlet plugs 30 may be replaced with, for example, liquid inlet plugs 30a including control valves 31 which open and close according to the internal pressure of the cell compartments 2a illustrated in FIG. 2. In the same manner, the liquid inlet plugs 30 may be replaced with liquid inlet plugs 30b having covers 32 which partially cover the gas exhaust path as illustrated in FIG. 3.

Figure 9:
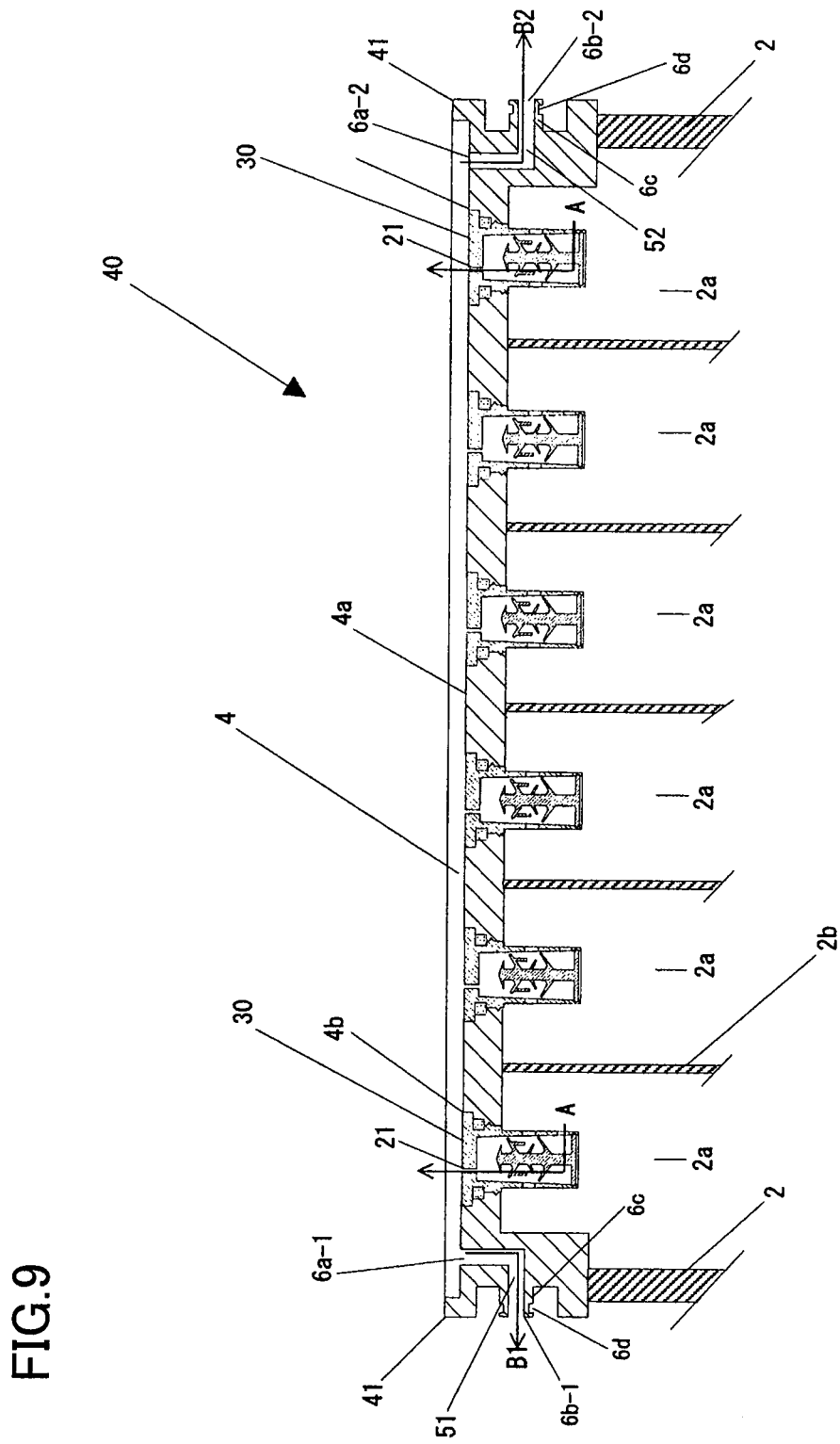
FIG. 9 is a cross-sectional view schematically illustrating a state in the middle of assembly of the lead-acid battery of the second embodiment.

In the battery 40 of this embodiment, the cover 41 has a plurality of separate second gas exhaust paths B. The phrase "separate" herein means that the inlet, the outlet, and the path between the inlet and the outlet of one gas exhaust path do not overlap with those of another gas exhaust path, and that any two gas exhaust paths do not communicate with each other. Then, the structure of the second gas exhaust paths B is described. FIG. 9 is a view illustrating a cross section in a state in which the cover 41 is joined to a container 2. In the example of FIG. 9, the cover 41 has two second gas exhaust paths B. For convenience in distinguishing these two second gas exhaust paths B from each other, the left-hand second gas exhaust path B in FIG. 9 is referred to as a second gas exhaust path B1, and the right-hand second gas exhaust path B is referred to as a second gas exhaust path B2.

Similarly to the second gas exhaust path B of the first embodiment, the second gas exhaust path B1 is a through hole 51 penetrating the cover 41 and starting from a first opening 6a-1 which is open to the recess 4, to a portion of the outer surface of the cover 41 except for the recess 4, preferably to a second opening 6b-1 at the external side surface of the cover 41. Accordingly, when gas is introduced into the through hole 51 through the first opening 6a-1, this gas passes through the through hole 51 to reach the second opening 6b-1, and then is released to outside the battery 40.

In the same manner as the above second gas exhaust path B1, the second gas exhaust path B2 is a through hole 52 penetrating the cover 41, and starting from a first opening 6a-2 which is open to the recess 4 to a second opening 6b-2 provided at the outer surface of the cover 41. Accordingly, when gas is introduced into the through hole 52 through the first opening 6a-2, the gas passes through the through hole 52 to reach the second opening 6b-2, and then is released to outside the battery 40.

Each of the second openings 6b-1 and 6b-2 needs to have an exhaust pipe attachment structure in order to attach an exhaust pipe (not shown) for guiding gas generated in the cell compartments to a place where the gas is to be released from the location of the battery 40, such as inside the cabin or trunk, into the atmosphere. This is obvious from the fact that the battery 40 described below has a collective exhaust structure and the purpose of having this collective exhaust structure. Thus, the exhaust pipe attachment structure is not a feature of this embodiment.

In the example illustrated in FIG. 9, each of the second openings 6b-1 and 6b-2 is provided with the nozzle 6c shown in FIG. 4 and an engagement means for ensuring stationary attachment between the nozzle 6c and the exhaust pipe.

In the battery 40, the second gas exhaust paths B1, B2 are separated from each other. Specifically, the first opening 6a-1 of the second gas exhaust path B1 and the first opening 6a-2 of the second gas exhaust path B2 are formed at different locations in the recess 4, and are not shared. In addition, the second opening 6b-1 of the second gas exhaust path B1 and the second opening 6b-2 of the second gas exhaust path B2 are formed at different locations in the outer surface of the cover 41 except for the recess 4, and are not shared. The through hole 51 of the second gas exhaust path B1 and the through hole 52 of the second gas exhaust path B2 are formed at different locations in the cover 41, and do not communicate with each other in the cover 41.

Figure 10:
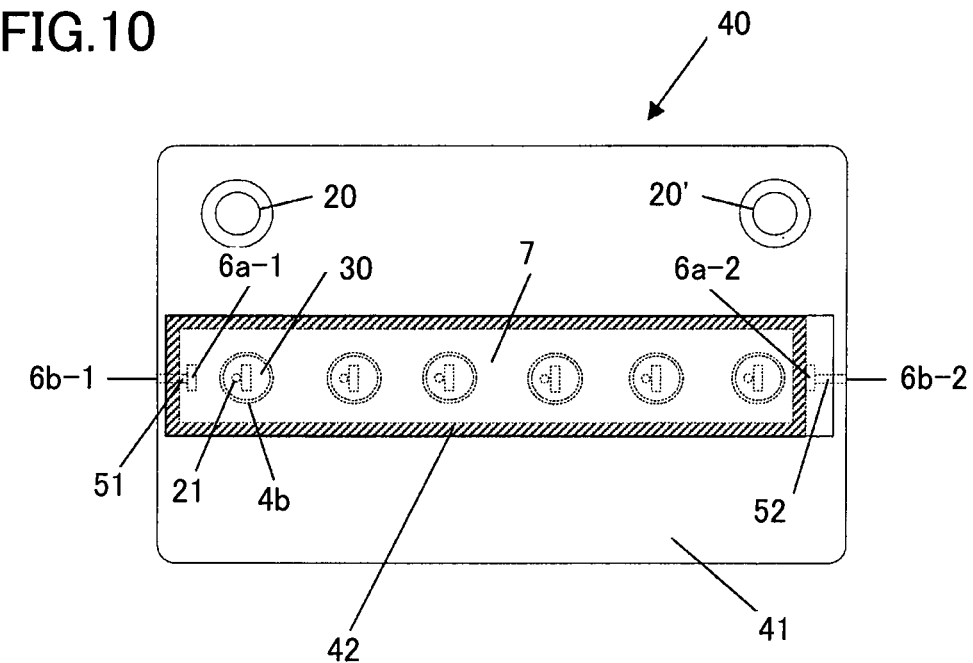
FIG. 10 is a view illustrating a top panel of the lead-acid battery of the second embodiment.
Figure 11:
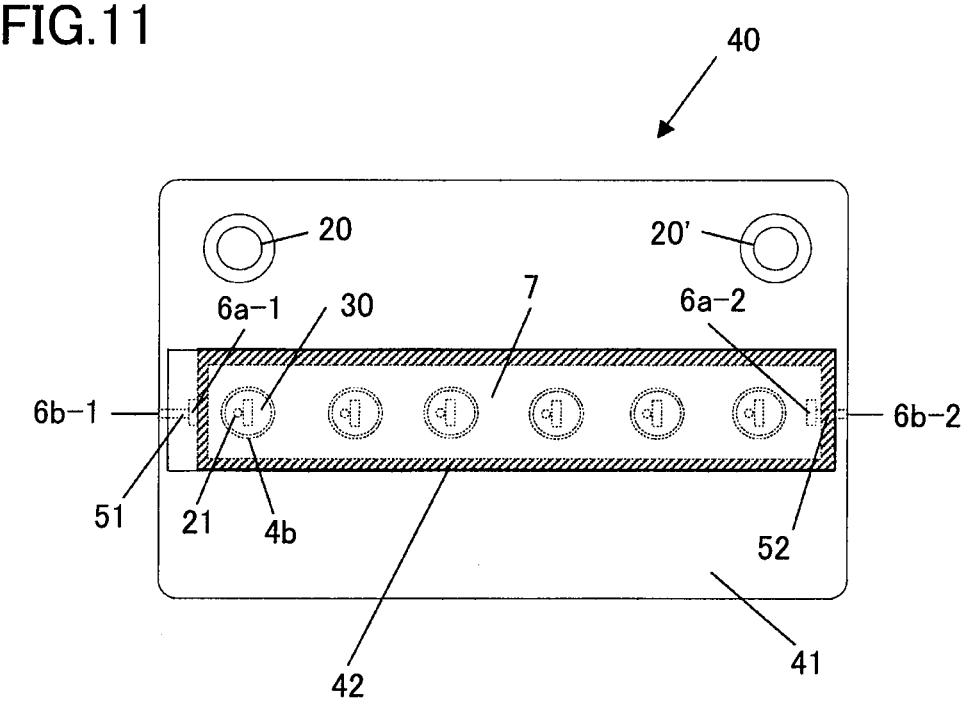
FIG. 11 is a view illustrating a top panel of another lead-acid battery according to the second embodiment
Figure 12:
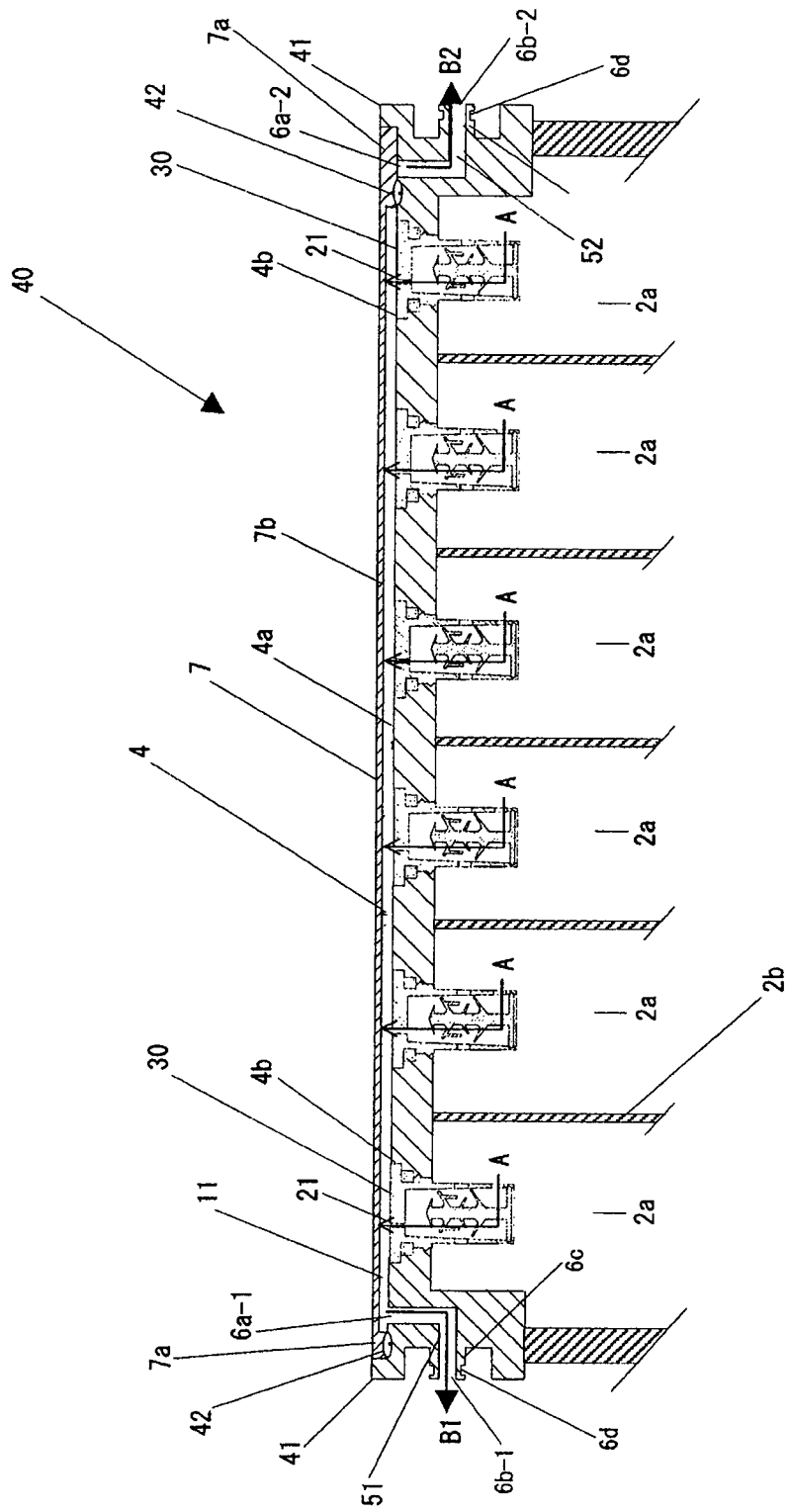
FIG. 12 is a cross-sectional view illustrating a main portion of a lead-acid battery according to the second embodiment.
Figure 13:
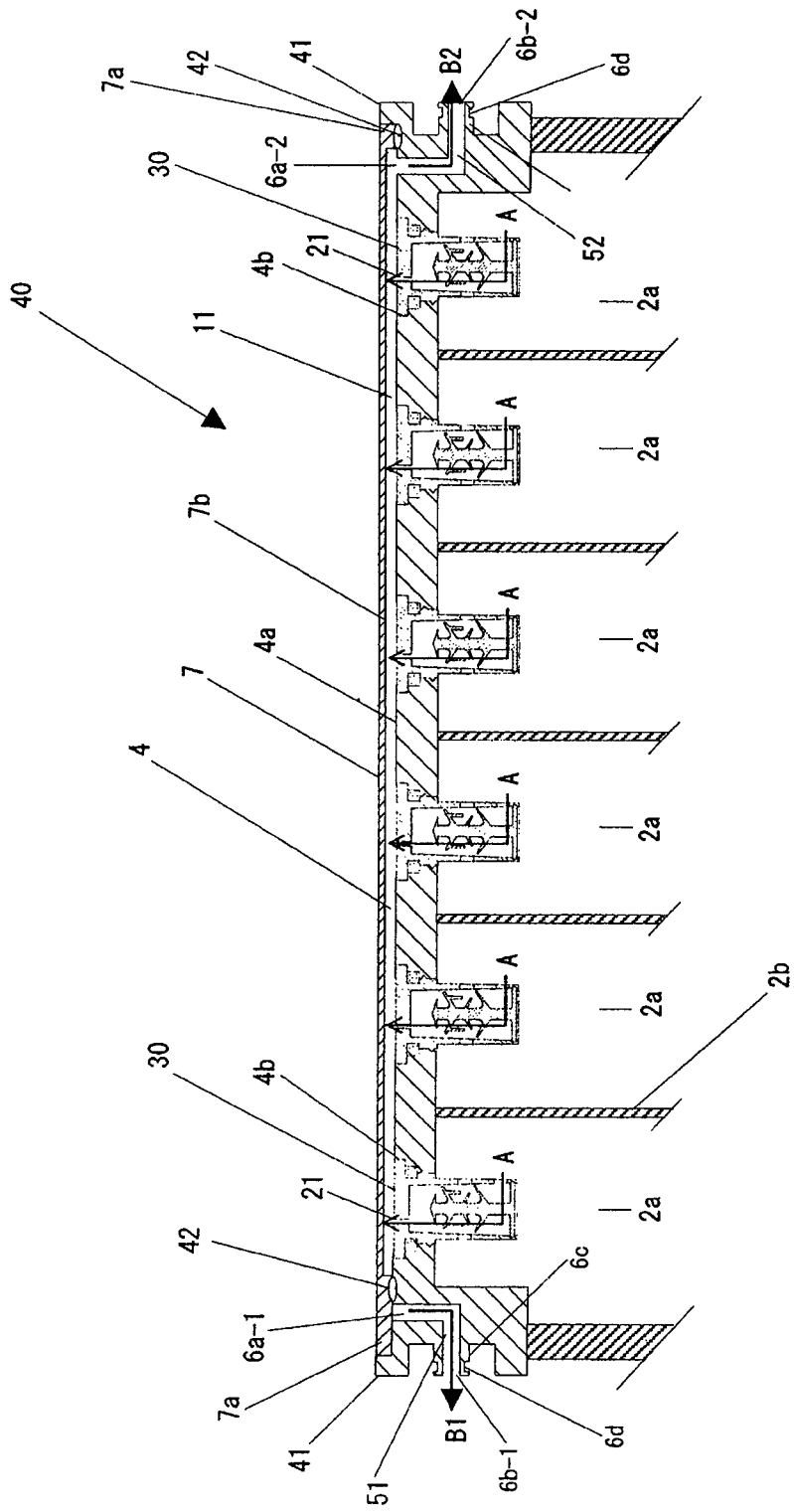
FIG. 13 is a cross-sectional view illustrating a main portion of another lead-acid battery according to the second embodiment.

FIGS. 10 and 11 are views illustrating the top panel of the battery 40 in which the top lid 7 is joined to the top surface of the cover 41. FIG. 12 is a cross-sectional view illustrating a main portion of the battery 40 shown in FIG. 10. FIG. 13 is a cross-sectional view illustrating a main portion of the battery 40 shown in FIG. 11.

As illustrated in FIGS. 10 and 11, in this embodiment, the joint 42 between the top lid 7 and the cover 41 continuously extends in the shape of a band, and forms a closed rectangle near the periphery of the top lid 7. For convenience of description, the liquid inlet plugs 30, the first vents 21, the first openings 6a-1 and 6a-2, and the top lid 7, and/or the through holes 51, 52 and the second openings 6b-1, 6b-2 covered with the cover 41, are indicated by broken lines in these drawings. Since the joint 42 is covered with the top lid 7, the joint 42 is indicated by broken line and slashes.

In the battery 40 of this embodiment, a plurality of second gas exhaust paths B are provided. Alternatively, at least one of the second gas exhaust paths B may be formed to communicate with the first gas exhaust path A through the exhaust chamber 11 by selecting the location of the joint 42 between the top lid 7 and the top surface of the cover 41 so that this second gas exhaust path B serves as an actual gas exhaust path and the other second gas exhaust path B does not serve as an actual gas exhaust path.

That is, in the joint pattern 1 shown in FIG. 10, the first opening 6a-1 of one second gas exhaust path B is located within the closed shape (i.e., the rectangle) formed by the joint 42, and the first opening 6a-2 of the other second gas exhaust path B is located outside the closed shape.

The joint 42 forming a closed shape, the top surface of the cover 41, and the top lid 7 form an exhaust chamber 11 for collecting gas ejected through the first vents 21. In the above-mentioned joint pattern 1, out of the second gas exhaust paths B1, B2, the second gas exhaust path B1 communicates with a first exhaust path through the exhaust chamber 11, and the other second gas exhaust path B2 is isolated from the exhaust chamber 11 by the joint 42.

Accordingly, as illustrated in FIG. 12, out of the second openings 6b-1 and 6b-2, the second opening 6b-1 serves as a gas exhaust vent for releasing gas actually generated in the cell compartments 2a to outside the battery, and the second opening 6b-2 does not serve as a gas exhaust vent, and gas generated in the cell compartments 2a is not released through the second opening 6b-2.

Now, a structure in which a joint pattern 2 shown in FIG. 11 is used instead of the joint pattern 1 shown in FIG. 10 is described. In the joint pattern 2 shown in FIG. 11, the first opening 6a-2 is located within a closed shape (i.e., a rectangle) formed by the joint 42, and the first opening 6a-1 is located outside the closed shape. This positional relationship is the reverse of the joint pattern 1. As in FIG. 10, the joint 42 is indicated by broken lines and slashes.

In the joint pattern 2, out of the second gas exhaust paths B1, B2, the second gas exhaust path B2 communicates with the first exhaust path through the exhaust chamber 11, and the second gas exhaust path B1 is isolated from the exhaust chamber 11 by the joint 42.

Accordingly, as illustrated in FIG. 13, out of the second openings 6b-1 and 6b-2, the second opening 6b-2 serves as a gas exhaust vent for releasing gas actually generated in the cell compartments 2a to outside the battery, and the second opening 6b-1 does not serve as a gas exhaust vent, and gas generated in the cell compartments 2a is not released through the second opening 6b-1.

In this embodiment, the location of the second opening 6b actually serving as a gas exhaust vent can be selected by selecting one of the two joint patterns shown in FIGS. 10 and 11. By selecting the joint pattern depending on the vehicle or equipment in which the battery is used, the location of the second opening 6b through which gas is released can be more appropriately selected. Such a selection is achieved only by selecting the joint pattern, and does not require additional parts or additional process steps. Thus, productivity does not decrease. In addition, a specific cover is needed for each battery type associated with the location of the gas exhaust vent. On the other hand, in this embodiment, the common cover can be used. Thus, a considerable advantage of cost reduction of a lead-acid battery can be achieved by utilizing the common cover. In addition, it is also possible to achieve another considerable advantage of eliminating the possibility of leakage of gas and acid mist into a cabin caused by an error in attaching a plug, as described above, or improper detachment in, for example, an inspection.

Preferably, in this embodiment, in order to ensure formation of the exhaust chamber 11 between the top lid 7 and the recess 4, and to ensure formation of the joint 42 for isolating one of the second openings 6b-1 and 6b-2, the top lid 7 has a structure shown in FIG. 14 in which a thick portion 7a is provided at the periphery of the surface of the top lid 7 facing the bottom 4a and the other part of this surface of the top lid 7 serves as a thin portion 7b thinner than the thick portion 7a, as in the first embodiment.

In this structure, a portion in which the thick portion 7a and the recess 4 are in contact with each other forms a joint 42. In this manner, the thin portion 7b can ensure formation of the exhaust chamber 11.

In the case of providing the thin portion 7b, a support 7c having the same height as the thick portion is preferably formed at a portion of the top lid 7 corresponding to the bottom 4a of the recess 4. This support 7c does not need to be provided on the top lid 7, and may project from the bottom 4a.

In the case of providing the thick portion 7a and the thin portion 7b, the thick portion 7a is brought into contact with a portion near the first opening 6a to be isolated. This is because if this thick portion 7a was not in contact with the above portion, no joints could be formed. In addition, the thin portion 7b preferably faces the first opening 6a not to be isolated. In this case, the gas more smoothly flows from the exhaust chamber 11 into the first opening 6a not to be isolated.

Accordingly, as shown in FIG. 14, suppose the width of the thick portion 7a at an end of the top lid 7 associated with the first opening 6a to be isolated is defined as L, the thick portion 7a having a width L is preferably brought into contact with the first opening 6a to be isolated by setting the width L larger than the width L' of the thick portion 7a at an end of the top lid 7 associated with the first opening 6a not to be isolated.

In such a configuration, as shown in FIG. 12, the thick portion 7a of the top lid is in contact with the first opening 6a-2 isolated from the exhaust chamber 11 (i.e., located outside the exhaust chamber 11). This configuration is preferable because hermeticity in the joint 42 between the first opening 6a-2 and the exhaust chamber 11 is enhanced in joining the top lid 7 and the top surface of the cover 41. In addition, this configuration is also preferable for the following reason. Since the thin portion 7b faces the first opening 6a-1 not to be isolated from the exhaust chamber 11 and establishing communication therewith, gas which has passed through the first vents smoothly flows from the exhaust chamber 11 into the first opening 6a-1, resulting in smooth ejection of the gas through the second opening 6b-2.

In the example shown in FIG. 8, the first openings 6a-1 and 6a-2 are respectively provided at locations near both ends in the longitudinal direction of the recess 4. In such a configuration, in the example shown in FIG. 12 in which the first opening 6a-2 is isolated from the exhaust chamber 11, if the first opening 6a-1 is isolated from the exhaust chamber 11 instead of the first opening 6a-2, only the light and left of the top lid 7 are switched (i.e., the top lid 7 is rotated by 180° above the top surface of the cover 41) and the top lid 7 is attached to the recess 4, thereby obtaining the battery 40 with the structure shown in FIG. 13. Thus, it is unnecessary to prepare two types of parts for the top lid 7, and only one type of the top lid 7 is sufficient. Thus, the parts of the battery can be shared. In this regard, this configuration is preferable. In other words, when the first opening 6a-1 and the second opening 6b-2 are provided near portions which are located to be symmetric with respect to the top lid 7, one type of the top lid 7 can be commonly used.

In the example shown in FIG. 9, two second gas exhaust paths B are respectively provided at the centers of the side surfaces having shorter width of the battery 40. Alternatively, for example, the second gas exhaust paths B may be respectively provided at ends of the side surfaces having shorter width, or may be provided on the side surfaces having longer width. In this embodiment, the number of second gas exhaust paths B is not specifically limited. However, in view of environment in installing the battery 40 in a vehicle, the number of second gas exhaust paths B which is most demanded in the market is considered to be two to four.

In the second embodiment, the method for forming the joint between the top lid 7 and the recess 4 is not specifically limited. However, it is clear that heat welding using laser light 8a in the first embodiment is most preferable.

As already described above, the top lid 7 has a small thickness of about 1.5 mm in order to obtain larger capacity and higher output for the same battery dimensions in which the height of an exhaust structure is set as small as possible in order to reduce the battery size, or in which the electrode plate area is increased by assigning the reduced dimension to the electrode plate height. Accordingly, as described in the first embodiment, heat welding with laser light is preferably employed.

In this case, materials for the top lid 7 and the cover 41 may be selected such that the top lid 7 is transparent to laser light 8a, and heat generated by the laser light 8a at a contact portion between the top lid 7 and the cover 41 causes the top lid 7 and the cover 41 to be heat-welded, as described in the first embodiment. The example of the first embodiment may be applied to the other conditions such as conditions for application of the laser light 8a.

Preferably, in the second embodiment, in employing welding with laser light 8a for the joint between the top lid 7 and the cover 41, the joint pattern 1 shown in FIG. 10 and the joint pattern 2 shown in FIG. 11 are input beforehand, as application patterns of the laser light 8a, to a computer-controlled sweep device 9, and the operator selects a desired pattern from these joint patterns to drive the sweep device 9 and the laser light source 8. Then, the pattern of formation of the joint 42 is easily selected. Such a technique is applicable to future rewriting of a sweep program of the laser light source 8 according to the formation pattern of the joint 42 in fabrication of a battery of a type in which the first opening 6a is formed in the recess 4 at a completely different location. For this reason, the above technique is preferable in terms of versatility because changes in facilities and parts are minimized.

In the foregoing example, each of the patterns of the joints 42 shown in FIGS. 10 and 11 is provided between the top lid 7 and the bottom 4a. Alternatively, since the first opening 6a-1 only needs to be open to the exhaust chamber 11, the joint 42 may be provided on the side wall 4c of the recess 4, for example. In this case, laser light is applied onto the side wall 4c through the top lid 7 by setting the angle of the laser light applied on the top lid 7 not at a right angle but an oblique angle.

A label may be attached to the top lid 7 such that a tongue (not shown) covering the second opening 6b-2 isolated from the exhaust chamber 11 is provided on the label to be continuous to the label. This configuration is preferable because a hose for guiding gas is allowed to be attached to the second opening serving as an actual gas exhaust path without a mistake.

In the case of using a label continuous to the tongue covering the isolated second opening b as described above, if two second openings 6b-1 and 6b-2 are located to be symmetric about a point, only one of the second openings 6b-1 and 6b-2 can be blocked only by rotating the label by 180°. Specifically, by rotating the label by 180°, the state in which the second opening 6b-1 is blocked can be changed to the state in which the second opening 6b-1 is not blocked and the second opening 6b-2 is blocked, thereby uniting the types of labels into one. For this reason, this configuration is preferable in sharing components of the battery.

In the first and second embodiments, the porous filter as described above is preferably provided in the nozzle 6c or the through holes 5, 51, or 52 in order to prevent foreign materials from entering the battery 1, 40 from the nozzle 6c and to prevent flame on exhaust gas from entering the inside of the battery.

Other Embodiments

The foregoing embodiments are examples of the present invention, and do not limit the present invention. In the first and second embodiments, the length and width of the top lid 7 are approximately the same as those of the recess 4, and the top lid 7 is fit into the recess 4 to be fixed therein. Alternatively, in the second embodiment, the length of the top lid may be smaller than the recess 4. In this case, the first opening (i.e., 6a-2 in the joint pattern 1) located outside the exhaust chamber is not covered with the top lid to be exposed. To match with the joint pattern 2, the position of the top lid is changed such that the first opening 6a-1 is exposed and the first opening 6a-2 is located in the exhaust chamber. Such a top lid is one type of the top lids having the following configuration. The top lid has a projection (i.e., a thick portion) forming a closed band shape corresponding to the joint portion on the surface facing the top surface of the cover. When the top lid is placed at a first position on the top surface of the cover, a first exhaust chamber is formed. When the top lid is placed at a second position on the top surface of the cover, a second exhaust chamber is formed. In these configurations, this projection causes at least one of the second exhaust paths connected to the first exhaust chamber to be connected to a portion outside the second exhaust chamber, and causes at least another of the second exhaust paths connected to the portion outside the first exhaust chamber to be connected to the second exhaust chamber.

In the second embodiment, a thick portion (i.e., a projection) may be formed on each surface of the top lid such that the joint pattern 1 and the joint pattern 2 are selected individually for the front side and the back side of the top lid.

In the case of a relatively large lead-acid battery, a sufficient distance can be kept between the first openings and the liquid inlet plug and between the periphery of the recess and the first openings. In consideration of a joint between the top lid and the cover with an adhesive in the second embodiment, even when a relatively large amount of adhesive is used to maintain hermeticity for a long period of time, the adhesive does not block the first openings and the first vents, and does not extend over the battery.

Industrial Applicability

The present invention is useful for various lead-acid batteries, such as starter lead-acid batteries and vehicle lead-acid batteries, having collective exhaust structures.

DESCRIPTION OF REFERENCE CHARACTERS

A first gas exhaust path
B, B1, B2 second gas exhaust path
1 battery
2 container
2a cell compartment
2b partition
3 cover
4 recess
4a bottom
4b liquid inlet
4c side wall
5, 51, 52 through hole
6a, 6a-1, 6a-2 first opening
6b, 6b-1, 6b-2 second opening
6c nozzle
6d trench
7 top lid
7a thick portion (projection)
7b thin portion
8 laser light source
8a laser light
9 sweep device
10 joint
11 exhaust chamber
20, 20' battery terminal
21 first vent
30, 30a, 30b liquid inlet plug
31 control valve
32 cover
33 splash-protection member
40 battery
41 cover
42 joint

The invention claimed is:
1. A lead-acid battery, comprising:
 a container which includes a cell compartment for housing a plate pack and an electrolyte and has an opening at a top thereof;
 a cover extending over the opening of the container; and
 a top lid covering a recess formed in a top surface of the cover, wherein
 the top lid is joined to the top surface of the cover to enclose the recess so as to form an exhaust chamber, the cover includes an internal gas exhaust path for guiding gas generated in the plate pack, from the cell compartment to the exhaust chamber, and also includes a plurality of external exhaust paths which establish communication between the recess and a portion outside the battery, a first external exhaust path of the plurality of external exhaust paths and a second external exhaust path of the plurality of external exhaust paths are directly connected to the same recess, said first external exhaust path and said second external exhaust path being disposed on opposite ends of the lead-acid battery, wherein when said top lid is disposed on said cover in a first orientation, said first external exhaust path is directly coupled to said exhaust chamber so as to allow gas to flow from said exhaust chamber to said first external exhaust path, and said second external exhaust path is isolated from said exhaust chamber, and when said top lid is disposed on said cover in a second orientation, said second external exhaust path is directly coupled to said exhaust chamber so as to allow gas to flow from said exhaust chamber to said second external exhaust path, and said first external exhaust path is isolated from said exhaust chamber.

2. The lead-acid battery of claim 1, wherein a liquid inlet is formed in the top surface of the cover, and a liquid inlet plug including the internal gas exhaust path is attached to the liquid inlet.

3. The lead-acid battery of claim 1, wherein the internal gas exhaust path is provided with a control valve which opens to open the internal gas exhaust path when an internal pressure of the cell compartment is at a given value or more, and which closes to close the internal gas exhaust path when the internal pressure of the cell compartment is less than the given value.

4. The lead-acid battery of claim 1, wherein each of the top lid and the top surface of the cover is made of a thermoplastic resin, and a joint is formed by welding with laser light.

5. The lead-acid battery of claim 1, wherein the top lid has a projection extending in the form of a band and forming a closed shape, on a surface thereof facing the top surface of the cover.

6. The lead-acid battery of claim 4, wherein a light transmittance of laser light for use in welding through the top lid is higher than that of the laser light through the top surface of the cover.

7. The lead-acid battery of claim 1, wherein said top lid is joined to the top surface of the cover such that a joint between the top lid and the top surface of the cover continuously extends in the form of a band and forms a closed shape so that the top lid and part of the recess in the cover form said exhaust chamber.

8. The lead-acid battery of claim 1, wherein said second orientation is obtained by rotating the top lid by 180° relative to the first orientation in a direction in parallel with the top surface of the cover.

9. The lead-acid battery of claim 1, wherein said top lid is a single member.

* * * * *